(12) United States Patent
Okuda (10) Patent No.: US 9,477,095 B1
(45) Date of Patent: Oct. 25, 2016

(54) EYEGLASSES

(71) Applicant: CHARMANT CO., LTD., Sabae-shi, Fukui (JP)

(72) Inventor: Yuji Okuda, Sabae (JP)

(73) Assignee: CHARMANT CO., LTD., Sabae-shi, Fukui (JP)

( * ) Notice: Subject to any disclaimer, the term of this patent is extended or adjusted under 35 U.S.C. 154(b) by 0 days.

(21) Appl. No.: 14/752,234

(22) Filed: Jun. 26, 2015

(51) Int. Cl.
*G02C 5/14* (2006.01)

(52) U.S. Cl.
CPC .................................... *G02C 5/143* (2013.01)

(58) Field of Classification Search
CPC .......... G02C 3/003; G02C 5/12; G02C 1/04; G02C 5/143
USPC .......... 351/123, 111, 41, 158; D16/314, 300, D16/335, 338, 123, 129, 316
See application file for complete search history.

(56) References Cited

U.S. PATENT DOCUMENTS

| | | | |
|---|---|---|---|
| 1,533,506 A * | 4/1925 | Mann | G02C 3/003 351/123 |
| 3,503,676 A * | 3/1970 | O'Neill | G02C 3/003 351/111 |
| 3,832,043 A * | 8/1974 | Usdan | G02C 11/00 351/123 |
| 4,240,718 A * | 12/1980 | Wichers | G02C 3/003 351/111 |
| 4,886,349 A * | 12/1989 | Willis | G02C 3/00 351/111 |
| 5,005,965 A * | 4/1991 | Walters | G02C 3/003 351/119 |
| 5,719,655 A * | 2/1998 | Peschel | G02C 3/00 351/111 |
| 6,135,592 A * | 10/2000 | Preutz | G02C 1/02 351/111 |
| D550,271 S * | 9/2007 | Martin | D16/316 |
| 7,631,968 B1 * | 12/2009 | Dobson | H04M 1/05 345/8 |
| 2010/0283959 A1 * | 11/2010 | Miyashita | G02C 5/001 351/123 |

FOREIGN PATENT DOCUMENTS

JP      H08-211338 A      8/1996

* cited by examiner

*Primary Examiner* — Hung Dang
(74) *Attorney, Agent, or Firm* — Muncy, Geissler, Olds & Lowe, P.C.

(57) ABSTRACT

It is a subject of the present invention to provide eyeglasses which can be easily put on and off with one hand and which are capable of preventing shifts of the eyeglasses when worn. The present invention relates to eyeglasses 100 comprising a pair of right and left lenses R, a front frame portion 1 supporting the lenses R, a pad portion 2 mounted to a center of the front frame portion 1, a temple portion 5 extending rearward from an end portion on one side of the front frame portion 1 and an abutting portion 10 formed at an end portion on the other side of the front frame portion 1, wherein the temple portion 5 is hooked to an ear while the abutting portion 10 is in a state in which it abuts a side surface of a face.

12 Claims, 8 Drawing Sheets

Prior Art

FIG.8

EYEGLASSES

TECHNICAL FIELD

The present invention relates to eyeglasses and more particularly to eyeglasses which can be easily put on and off with one hand, and which are capable of preventing shifts of the eyeglasses when worn.

BACKGROUND ART

Figure 8:
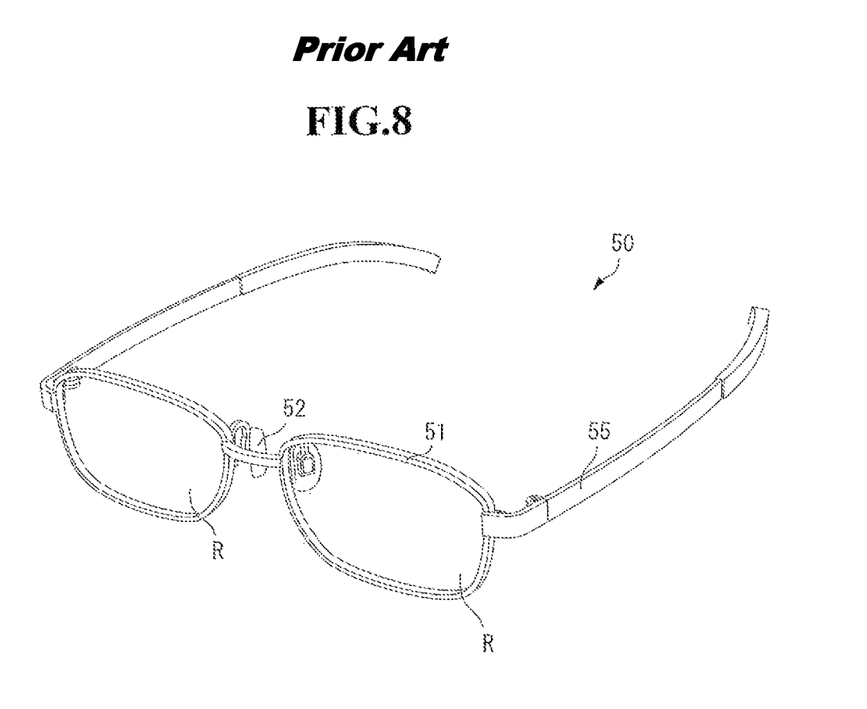
FIG. 8 is a perspective view showing conventional eyeglasses.

FIG. 8 is a perspective view showing conventional eyeglasses.

As shown in FIG. 8, conventional eyeglasses 50 include a pair of right and left lenses R, a frame body 51 supporting the lenses R, temple portions 55 mounted to both sides of the frame body 51 and pads 52 mounted to a central bridge of the frame body 51.

Conventional eyeglasses 50 are put on by holding respective temple portions 55 on both sides with one's hands and by putting them on corresponding right and left ears.

Accordingly, in case of the conventional eyeglasses 50, it is difficult to put them on using only one hand when the other hand is occupied or dirty.

In contrast thereto, eyeglasses of specific shapes including no temple portion on one side are being developed.

For instance, there are known eyeglasses in which a hair-fastening tool is mounted to a temple of the eyeglasses wherein the lens and the frame are supported by attaching the tool to one's hair (see, for instance, Patent Literature 1).

CITATION LIST

Patent Literature

PTL 1: Japanese Patent Application Laid-Open No. 08-211338

SUMMARY OF INVENTION

Technical Problem

However, in case of the eyeglasses recited in the above Patent Literature 1, since the eyeglasses are supported at two spots, namely the temple and the hair-fastening tool, there are drawbacks in that the eyeglasses are quite unstable and easily shift when worn.

The present invention has been made in view of the above facts, and it is an object thereof to provide eyeglasses which can be easily put on and off with one hand and which are capable of preventing shifts of the eyeglasses when worn.

Solution to Problems

In performing earnest studies for solving the above problem, the inventors of the present invention have found that the above problems can be surprisingly solved by providing a temple portion only on one side of a front frame portion while an abutting portion which abuts a side surface of a face is formed on the other side, and have come to complete the present invention.

The present invention resides in (1) eyeglasses comprising a pair of right and left lenses, a front frame portion supporting the lenses, a pad portion mounted to the center of the front frame portion, a temple portion extending rearward from an end portion on one side of the front frame portion and an abutting portion formed at an end portion on the other side of the front frame portion, wherein the eyeglasses are put on by hooking the temple portion to an ear while the abutting portion is in a state in which it abuts a side surface of a face.

The present invention resides in (2) eyeglasses recited in above (1) wherein the temple portion is formed with a picking portion along a longitudinal direction of the temple portion.

The present invention resides in (3) eyeglasses recited in above (1) or (2) wherein the abutting portion is comprised of a base portion mounted to the end portion on the other side of the front frame portion to project inward and a disk-like head portion coupled to the base portion, and has a T-like shape when seen from the side.

The present invention resides in (4) eyeglasses recited in above (3) wherein a peripheral edge of the head portion on the opposite side of the base portion has a tapered shape.

The present invention resides in (5) eyeglasses recited in above (1) or (2) wherein the abutting portion has a polygonal pillar-like shape extending along a longitudinal direction of the front frame portion.

The present invention resides in (6) eyeglasses recited in any one of above (1) to (5) wherein the abutting portion is slidable along the front frame portion.

The present invention resides in (7) eyeglasses recited in any one of above (1) to (6) wherein the end portion on the other side of the front frame portion has a J-like shape with its tip being folded back to the inside.

The present invention resides in (8) eyeglasses recited in any one of above (1) to (7) wherein the front frame portion is comprised of a supporting portion supporting the lenses, a first frame portion extending to one side of the supporting portion and a second frame portion extending to the other side of the supporting portion, wherein the pad portion is mounted to a center of the supporting portion, wherein the temple portion extends rearward from the end portion of the first frame portion, wherein the abutting portion is formed at an end portion of the second frame portion and wherein the second frame portion has a loop-like shape.

The present invention resides in (9) eyeglasses recited in above (8) wherein a tip end and a rear end of the second frame portion are inserted into the supporting portion, and wherein the tip end or the rear end is slidable within the supporting portion.

The present invention resides in (10) eyeglasses recited in any one of above (1) to (9) wherein a mounting portion is formed at the other side of the front frame portion and an external temple portion is freely attachable/detachable to and from the mounting portion.

The present invention resides in (11) eyeglasses recited in above (10) wherein the external temple portion is a temple portion with a monitor.

Advantageous Effects of Invention

In case of the eyeglasses according to the present invention, by providing only one side of the front frame portion as the temple portion while providing the other side as the abutting portion, the eyeglasses can be put easily on and off with one hand. Namely, they can be put on by putting the temple portion on an ear in a state in which the abutting portion abuts a side surface of a face.

Further, since the eyeglasses are fixed at three spots, that is, the temple portion, the pad portion and the abutting portion, it is possible to prevent shifts of the eyeglasses when worn.

In case of the eyeglasses according to the present invention, since the temple portion is formed with the picking portion along the longitudinal direction of the temple portion, the eyeglasses can be more easily put on by grasping the picking portion.

For instance, when the temple portion has a narrow rod-like shape, there is a drawback that the eyeglasses are randomly rotated around the temple portion when the temple portion is directly gripped, but this can be prevented by providing the picking portion and by grasping the picking portion.

In case of the eyeglasses according to the present invention, when the abutting portion is comprised of the base portion and the head portion, and has a T-like shape when seen from the side, it is of advantage that the base portion having a relatively small diameter can be easily mounted to the front frame portion, while it is of advantage that the head portion having a relatively large diameter can reduce pressure loading to the face when abutted to the side surface of a face.

Further, since the peripheral edge of the disk-like head on the opposite side of the base portion has a tapered shape, it is possible to restrict that the side surface of the face is scratched by the abutting portion even if the worn eyeglasses are shifted.

In case of the eyeglasses according to the present invention, when the abutting portion has a polygonal pillar-like shape extending in the longitudinal direction of the front frame portion, it is of advantage that the eyeglasses can be easily abutted in accordance with the shape of the side surface of the face.

In case of the eyeglasses according to the present invention, when the abutting portion is slidable along the front frame portion, it is possible to adjust the position of the abutting portion.

In case of the eyeglasses according to the present invention, when the end portion on the other side of the front frame portion has a J-like shape with its tip being folded back to the inside, the degree of freedom of the end portion on the other side of the front frame portion is improved. With this arrangement, the abutting portion can be reliably abutted in accordance with the shape of the side surface of the face.

In case of the eyeglasses according to the present invention, when the front frame portion is comprised of the supporting portion supporting the lenses, the first frame portion extending to one side of the supporting portion and the second frame portion extending to the other side of the supporting portion and the second frame portion has a loop-like shape, there will be no temple portion at the second frame portion while the first frame portion is formed with a temple portion, it is possible to equilibrate the entire weight balance by forming the second frame portion to have a loop-like shape.

At this time, when a tip end and a rear end of the second frame portion are inserted into the supporting portion, and the tip end or the rear end is slidable within the supporting portion, it is possible to adjust the position of the abutting portion by sliding the tip end or the rear end of the second frame portion.

In case of the eyeglasses according to the present invention, since the mounting portion is formed at the other side of the front frame portion and the external temple portion is freely attachable/detachable to and from the mounting portion, it is possible to add desired functions by attaching the external temple portion.

For instance, when the external temple portion is a temple portion with a monitor, it is possible to watch movies or the like through the monitor, and it is also possible to use the Internet by using a computer stored in the external temple portion through the monitor.

BRIEF DESCRIPTION OF DRAWINGS

FIG. 1(*a*) is a perspective view showing eyeglasses according to the first embodiment, and FIG. 1(*b*) is a plan view thereof.

FIG. 3(*a*) is a perspective view showing eyeglasses according to the second embodiment, and FIG. 3(*b*) is a plan view thereof.

FIG. 4(*a*) is a perspective view showing eyeglasses according to the third embodiment, and FIG. 4(*b*) is a plan view thereof.

FIG. 6(*a*) and FIG. 6(*b*) are perspective views showing eyeglasses according to another embodiment.

FIG. 7(*a*) and FIG. 7(*b*) are perspective views showing abutting portions of eyeglasses according to another embodiment.

DESCRIPTION OF EMBODIMENTS

Preferred embodiments of the present invention will be explained in details while referring to the drawings as necessary. In this respect, identical elements are marked with identical reference signs in the drawings, and duplicated explanations will be omitted. Further, dimension ratios in the drawings are not limited to the illustrated ratios.

First Embodiment

Figure 1A:
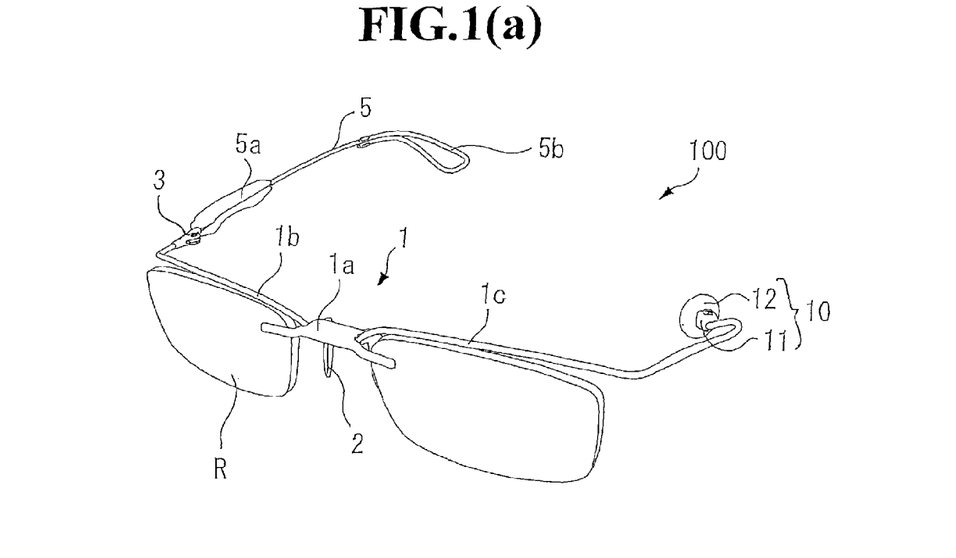
Figure 1B:
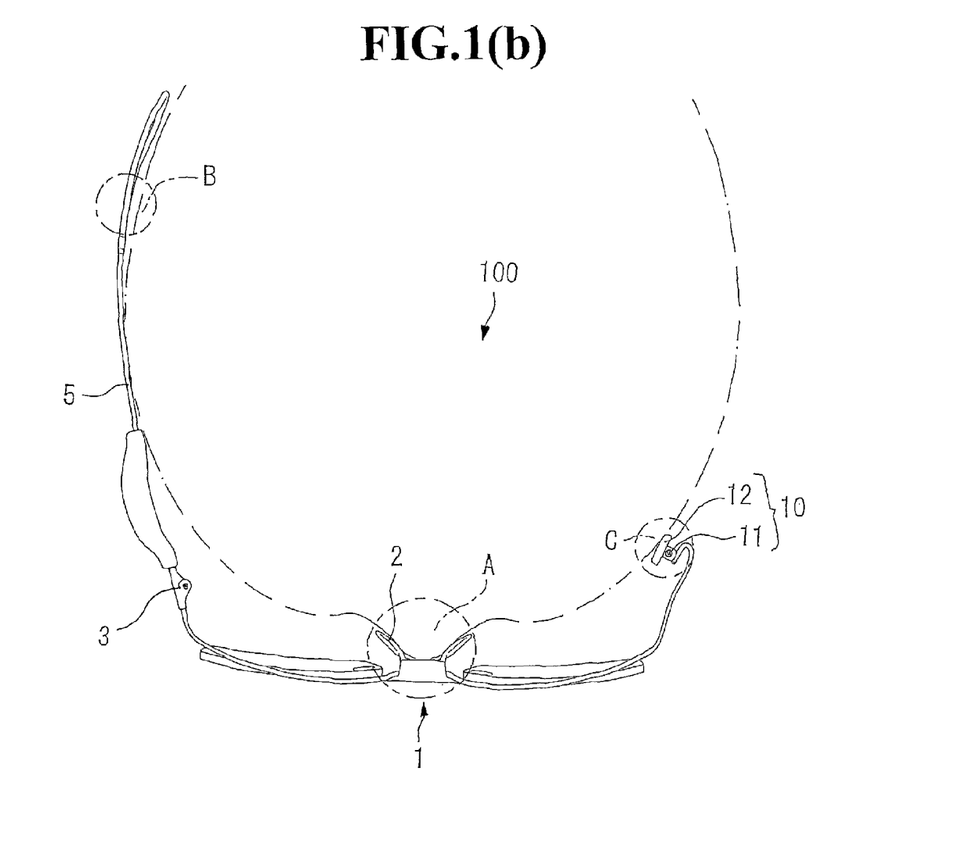

FIG. 1(*a*) is a perspective view showing eyeglasses according to the first embodiment, and FIG. 1(*b*) is a plan view thereof.

As shown in FIG. 1(*a*) and FIG. 1(*b*), the eyeglasses 100 according to the first embodiment include a pair of right and left lenses R, a front frame portion 1 supporting the lenses R, a pad portion 2 mounted to the center of the front frame portion 1, a hinge portion 3 formed at an end portion on one side of the front frame portion 1, a temple portion 5 extending rearward from the hinge portion 3 and an abutting portion 10 formed at an end portion on the other side of the front frame portion 1 to project to the inside.

In case of the eyeglasses 100 according to the first embodiment, only one side of the front frame portion 1 includes the temple portion 5 via the hinge portion 3, and the other side does not have a hinge portion or a temple portion.

The front frame portion 1 is comprised of a supporting portion 1*a*, a first frame portion 1*b* extending from the supporting portion 1*a* to one side and a second frame portion 1*c* extending from the supporting portion 1*a* to the other side.

In this respect, the first frame portion 1*b* and the second frame portion 1*c* are left-right asymmetric.

While materials of the first frame portion 1*b* and the second frame portion 1*c* are not particularly limited here, it is possible to use, among others, titanium, titanium alloys or stainless steel. Among these, the materials are preferably β titanium or SUS304 which exhibit elasticity.

When the first frame portion 1b and the second frame portion 1c exhibit elasticity, it will be possible to expand the temple portion 5 to the outside while the abutting portion 10 is in a state in which it abuts the side surface of the face, and the eyeglasses can be more easily put on.

Further, since the abutting portion 10 or the temple portion 5 is pressed to the inside through restoring force of the first frame portion 1b and the second frame portion 1c, the worn eyeglasses will be more hardly shifted.

Moreover, since the lenses R are not fitted into the first frame portion 1b or the second frame portion 1c, it is easier to expand the first frame portion 1b and the second frame portion 1c to the outside.

In the front frame portion 1, the supporting portion 1a supports the pair of lenses R in the right and left direction by pinning.

The pad portion 2 is mounted at the center of the supporting portion 1a to face inside. In this respect, the pad portion 2 is a portion that is hooked to the nose when the eyeglasses 100 are worn, and known ones can be suitably used.

The first frame portion 1b is configured to extend from the supporting portion 1a along an upper surface of a lens R and to be bent rearward at substantially right angles upon exceeding the lens R, and the hinge portion 3 is formed at an end portion thereof.

Then, the temple portion 5 is mounted to the hinge portion 3 to be rotatable in the horizontal direction.

The temple portion 5 is configured to warp in the horizontal direction to extend along the contour of the side surface of the face, and a loop-like hook portion 5b to be hooked to an ear is formed at a rear end portion thereof. In this respect, the hook portion 5b has a shape which lower portion is warped to extend along the shape of the root of the ear.

Further, the temple portion 5 is formed with a picking portion 5a along the longitudinal direction thereof.

Figure 2:
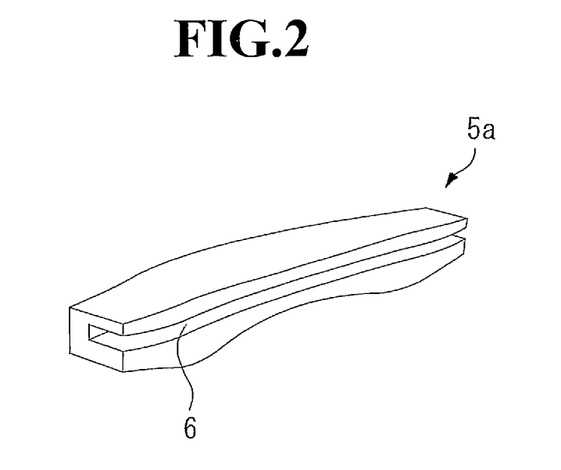
FIG. 2 is a perspective view showing a picking portion of the eyeglasses according to the first embodiment.

FIG. 2 is a perspective view showing the picking portion of the eyeglasses according to the first embodiment.

As shown in FIG. 2, the picking portion 5a has a broad width in the horizontal direction so as to enable easy picking with fingers, and has a concave lower side. Therefore, in case of the eyeglasses 100, the eyeglasses can be easily put on also with one hand by grasping the picking portion 5a.

The picking portion 5a is formed with a groove 6 extending along the longitudinal direction of the temple portion 5.

By fitting the temple portion 5 into the groove 6, the picking portion 5a is mounted to the temple portion 5.

The picking portion 5a is slidable along the longitudinal direction of the temple portion 5. With this arrangement, the picking portion 5a can also be disposed at a desired position.

Returning to FIG. 1, the second frame portion 1c extends from the supporting portion 1a along the upper surface of the lens R and is bent rearward at substantially right angles upon exceeding the lens R, and its tip end has a J-like shape with its tip end being folded back to the inside.

Then, the abutting portion 10 is mounted to the tip end portion of the end portion to project towards the inside.

Here, the abutting portion 10 is mounted to the tip end of the end portion by screw fastening. Accordingly, it can be easily exchanged by detaching the screw.

In case of the eyeglasses 100 according to the first embodiment, the end portion on the other side of the front frame portion (end portion of the second frame portion 1c) has a J-like shape with its tip end being folded back to the inside, the degree of freedom of the tip end on the other side of the front frame portion 1 is improved. Namely, the angle or position can be suitably corrected in accordance with the shape of the side surface of the face and the abutting portion 10 can be reliably abutted against the side surface of the face.

The abutting portion 10 is comprised of a base portion 11 mounted to inside of the end portion on the other side of the front frame portion (end portion of the second frame portion 1c) and a disk-like head portion 12 coupled to the base portion 11 and formed to be larger than the same. In this respect, the disk-like shape might include those having a perfect circular shape or an elliptic shape when seen from the top.

Here, while the material of the head portion 12 is not particularly limited, it is preferably silicone or rubber. In this case, it will be of advantage that the eyeglasses hardly slip when worn.

In the abutting portion 10, the head portion 12 has a relatively large diameter such that the surface area contacting the face, when the abutting portion is abutted against the side surface of the face, becomes large, and consequently, it is possible to reduce pressure loading to the face through the abutment.

The head portion 12 is configured in that its peripheral edge on the opposite side of the base portion 11 has a tapered shape. Therefore, even if the worn eyeglasses 100 are shifted, they will move to slide along the side surface of the face since the peripheral edge of the head portion 12 has a tapered shape. Consequently, it is possible to restrict scratching of the side surface of the face. Further, since there is no directionality when the eyeglasses 100 are shifted in vertical and lateral directions, the hardness of shift will be same in all directions.

In case of the eyeglasses 100 according to the first embodiment, by picking the picking portion 5a with one hand and hooking the temple portion 5 to an ear in a state in which the abutting portion 10 abuts proximate of the temple of the side surface of the face, the eyeglasses can be easily put on and easily put off through reverse operations.

When the eyeglasses 100 are worn, they are fixed on the face at three spots (point A, point B and point C) of the temple portion 5, the pad portion 2 and the abutting portion 10, and it is possible prevent the eyeglasses 100 from being shifted when worn.

Second Embodiment

Figure 3A:
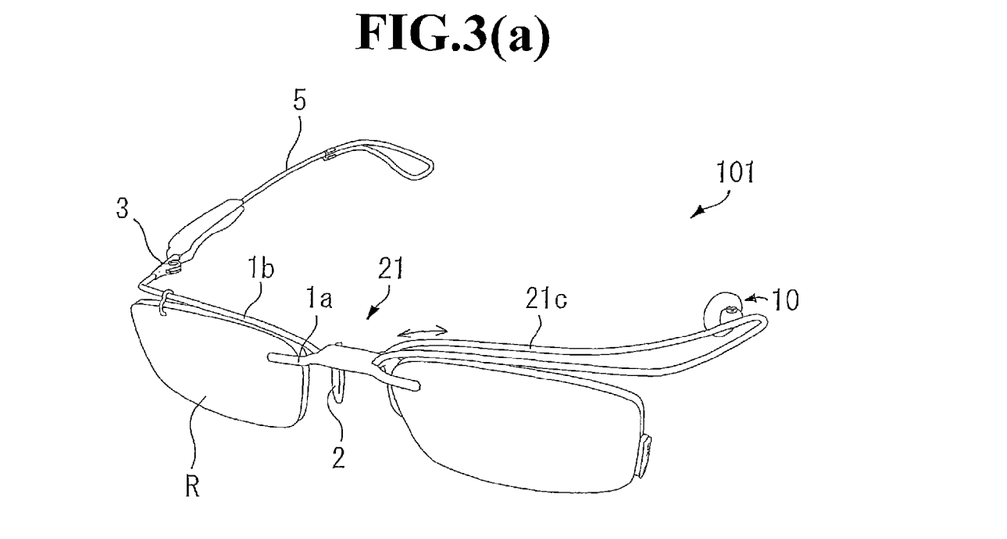
Figure 3B:
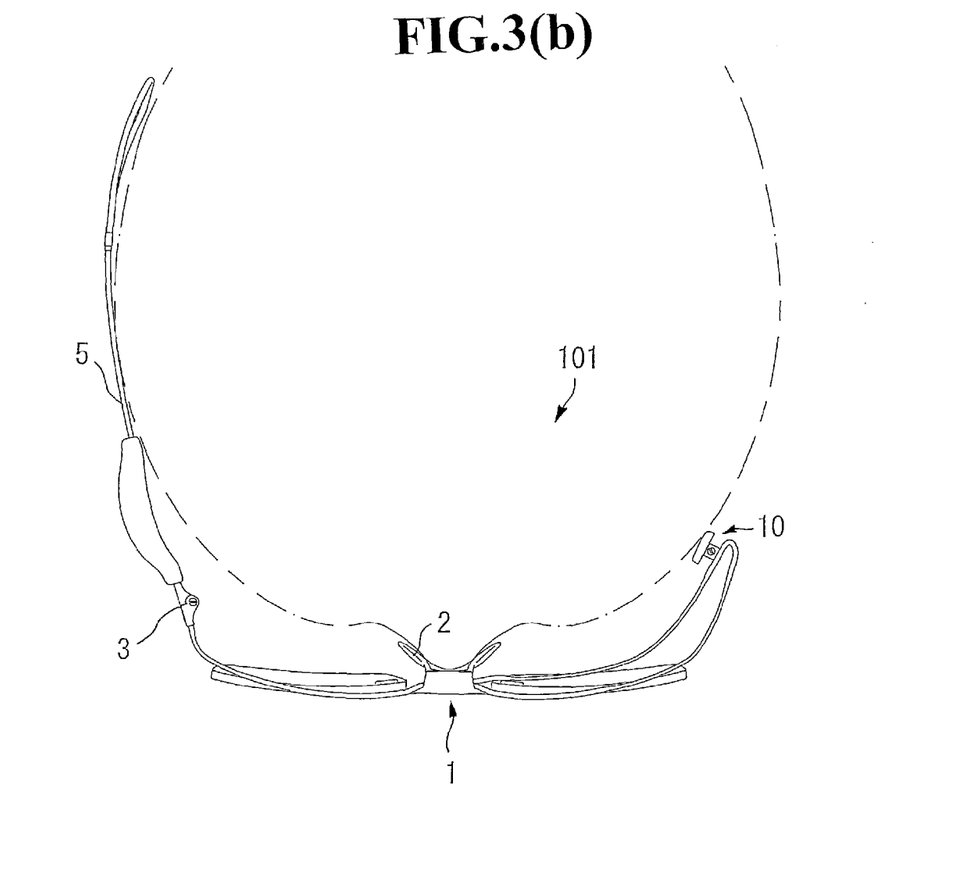

FIG. 3(a) is a perspective view showing eyeglasses according to the second embodiment, and FIG. 3(b) is a plan view thereof.

As shown in FIG. 3(a) and FIG. 3(b), the eyeglasses 101 according to the second embodiment include a pair of right and left lenses R, a front frame portion 21 supporting the lenses R, a pad portion 2 mounted to the center of the front frame portion 21, a hinge portion 3 formed at an end portion on one side of the front frame portion 21, a temple portion 5 extending rearward from the hinge portion 3 and an abutting portion 10 formed at an end portion on the other side of the front frame portion 21 to project to the inside.

Further, the front frame portion 21 is comprised of a supporting portion 1a, a first frame portion 1b extending from the supporting portion 1a to one side and a loop-like second frame portion 21c extending from the supporting portion 1a to the other side.

Namely, the eyeglasses 101 according to the second embodiment are identical to the eyeglasses 100 according to the first embodiment except for the point that the second frame portion 21c has a loop-like shape.

In case of the eyeglasses 101 according to the second embodiment, while the first frame portion 1b includes the temple portion 5, no temple portion 5 is formed at the second frame portion 21c so that the overall weight balance is maintained by forming the second frame portion 21c to have a loop-like shape.

While materials of the second frame portion 21c are not particularly limited, it is possible to use, among others, titanium, titanium alloys or stainless steel. Among these, the materials are preferably β titanium or SUS304 which exhibit elasticity.

When the second frame portion 21c exhibits elasticity, it will be possible to expand the temple portion 5 to the outside while the abutting portion 10 is in a state in which it abuts the side surface of the face, and the eyeglasses can be more easily put on.

Further, since the abutting portion 10 or the temple portion 5 is pressed to the inside through restoring force of the second frame portion 21c, the worn eyeglasses will be more hardly shifted.

The second frame portion 21c extends from the supporting portion 1a along the upper surface of the lens R and is bent rearward at substantially right angles upon exceeding the lens R, is folded back at its end portion and repeatedly extends along the upper surface of the lens R to be mounted to the supporting portion 1a.

Accordingly, the second frame portion 21c is configured in that its tip end and rear end are inserted and mounted to the supporting portion 1a.

At this time, the tip end and the rear end of the second frame portion 21c are slidable within the supporting portion 1a. Therefore, by sliding the tip end or the rear end, it is possible to adjust the position of the abutting portion 10.

In case of the second eyeglasses 101 according to the second embodiment, by picking the picking portion 5a with one hand and hooking the temple portion 5 to an ear in a state in which the abutting portion 10 abuts proximate of the temple of the side surface of the face similarly to the eyeglasses 100 of the first embodiment, the eyeglasses can be easily put on and easily put off through reverse operations.

When the eyeglasses 101 are worn, they are fixed on the face at three spots of the temple portion 5, the pad portion 2 and the abutting portion 10, and it is possible prevent the eyeglasses 101 from being shifted when worn.

Third Embodiment

Figure 4A:
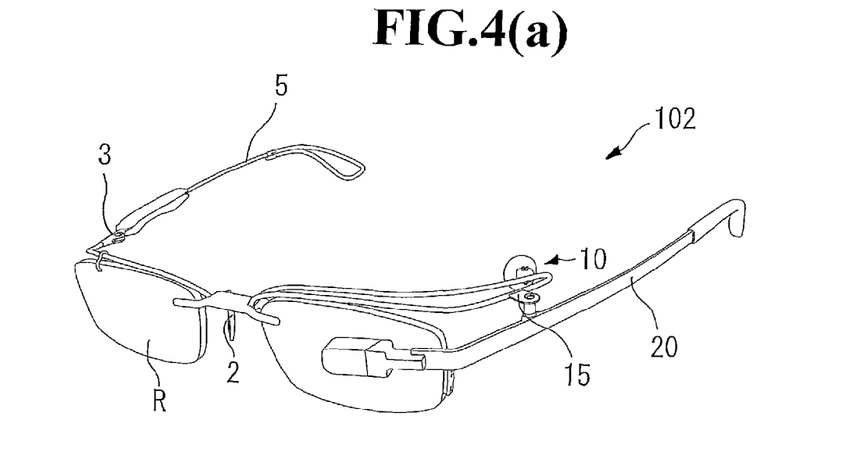
Figure 4B:
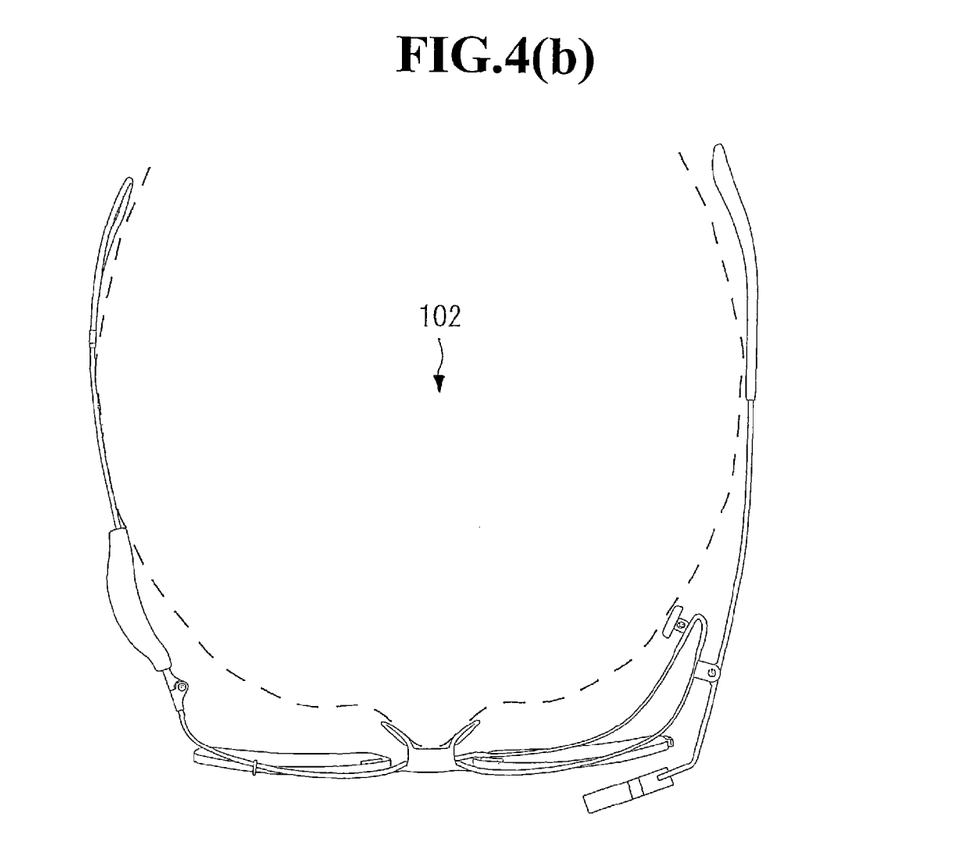

FIG. 4(a) is a perspective view showing eyeglasses according to the third embodiment, and FIG. 4(b) is a plan view thereof.

As shown in FIG. 4(a) and FIG. 4(b), the eyeglasses 102 according to the third embodiment include a pair of right and left lenses R, a front frame portion 1 supporting the lenses R, a pad portion 2 mounted to the center of the front frame portion 1, a hinge portion 3 formed at an end portion on one side of the front frame portion 1, a temple portion 5 extending rearward from the hinge portion 3, an abutting portion 10 formed at an end portion on the other side of the front frame portion 1 to project to the inside, a mounting portion 15 formed at the end portion on the other side of the front frame portion 1 to project to the outside and an external temple portion 20 mounted to the mounting portion to be freely attachable/detachable.

Namely, the eyeglasses 102 according to the third embodiment are identical to the eyeglasses 101 according to the second embodiment except for the point that they further comprise the mounting portion 15 and the external temple portion 20.

In case of the eyeglasses 102 according to the third embodiment, the first frame portion 1b is formed with the temple portion 5 while the second frame portion 21c is formed with the external temple portion 20 such that the overall weight balance is generally maintained.

Further, the external appearance of the external temple portion 20 is a temple-like shape and it can be hooked to an ear. Accordingly, also in case the weight differs depending on the type of the external temple portion 20 to be mounted, it is possible to stabilize the eyeglasses 102 when worn.

Figure 5:
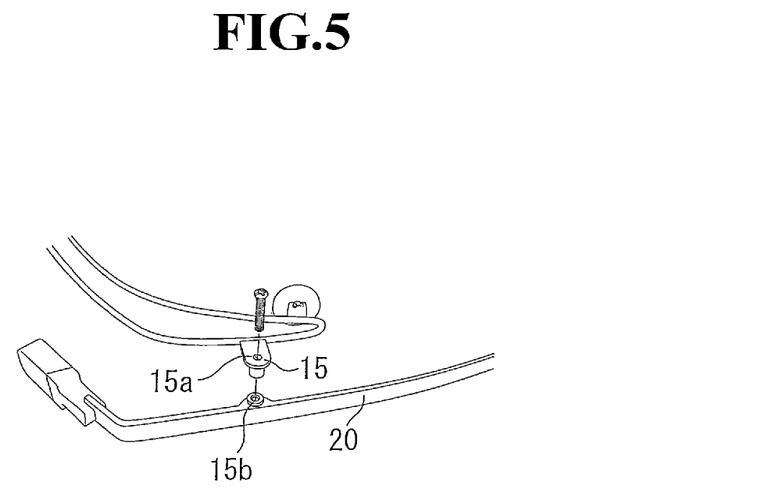
FIG. 5 is an explanatory view for explaining configurations for mounting a mounting portion and an external temple portion of the eyeglasses according to the third embodiment.

FIG. 5 is an explanatory view for explaining configurations for mounting a mounting portion and an external temple portion of the eyeglasses according to the third embodiment.

As shown in FIG. 5, in case of the eyeglasses 102, there are formed a first through hole 15a at the mounting portion 15 and a second through hole 15b at the external temple portion 20.

Then, by overlapping the first through hole 15a and the second through hole 15b and screwing both members together, it is possible to easily mount the external temple portion 20 to the mounting portion 15. Namely, the external temple portion 20 can be attached/detached by attaching/detaching a screw.

The external temple portion 20, for instance, might be a temple portion with a monitor. In this case, it is possible to watch movies or the like through the monitor and to use the Internet by using a computer stored in the external temple portion through the monitor.

While embodiments of the present invention have been explained so far, the present invention is not to be limited to the above embodiments.

While the eyeglasses 100, 101, 102 according to the first, second and third embodiments include a hinge portion 3 formed at an end portion on one side of the front frame portion 1 and a temple portion 5 extending rearward from the hinge portion 3, the hinge portion 3 is not an essential element.

For instance, it is possible that the eyeglasses do not have a hinge portion and the temple portion is directly formed rearward from an end portion on one side of the front frame portion.

While the eyeglasses 100, 101 according to the first and second embodiments comprise a front frame portion 1, a pad portion 2, a hinge portion 3, a temple portion 5 and an abutting portion 10, their shapes are not limited to those shown in FIG. 1(a) and FIG. 1(b).

Figure 6A:
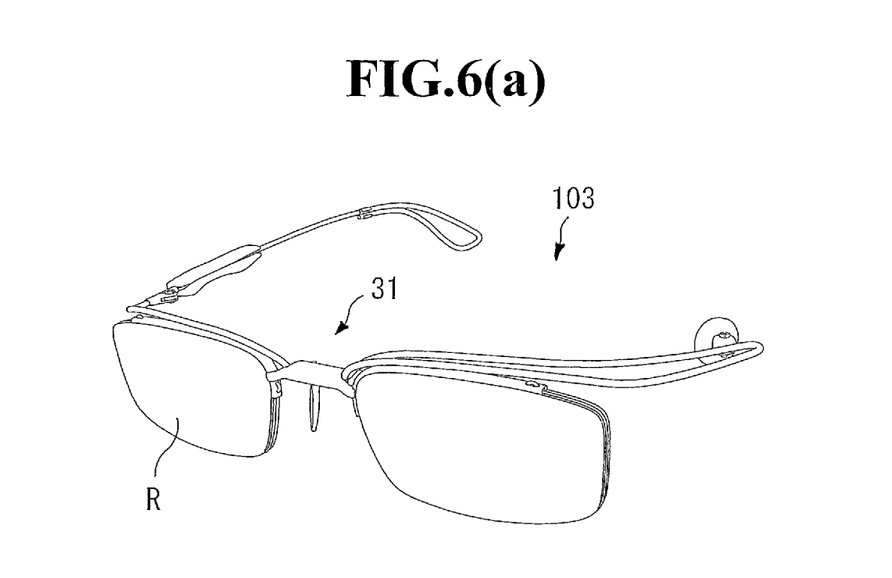
Figure 6B:
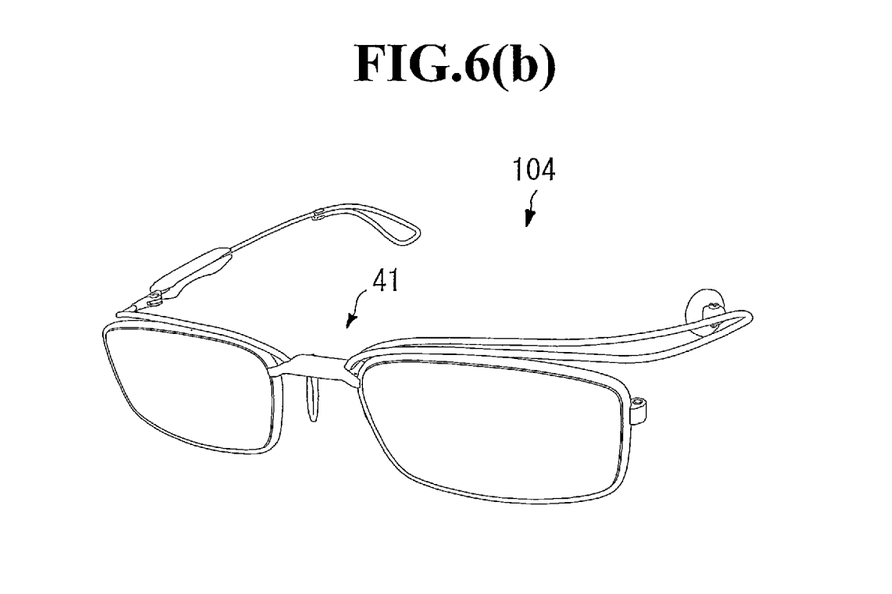

FIG. 6(a) and FIG. 6(b) are perspective views showing eyeglasses according to another embodiment.

As shown in FIG. 6(a), a front frame portion 31 of eyeglasses 103 might be formed with a frame body along an upper surface of a lens R.

As shown in FIG. 6(a), a front frame portion 41 of eyeglasses 104 might be formed with a frame body along peripheries of the lenses R.

While the eyeglasses 100, 101, 102 according to the first, second and third embodiments are formed with a loop-like hook portion 5b at the rear end portion of the temple portion 5, the shape of the hook portion 5b is not limited to this. For instance, it is also possible that a so-called end cover is mounted to the rear end portion of the temple portion.

While in case the eyeglasses 100, 101, 102 according to the first, second and third embodiments, the abutting portion 10 is mounted to the tip end of the end portion by screwing, the method of mounting is not limited to this. For instance, it is also possible that it is mounted by insert-fitting.

In case of the eyeglasses 100 according to the first embodiment, the abutting portion 10 is fixed to the tip end portion of the end portion of the second frame portion 1c, it is also possible that the abutting portion 10 is configured to be slidable along the second frame portion 1c. In this case, it is of advantage that the position of the abutting portion can be adjusted.

In case of the eyeglasses 100 according to the first embodiment, the abutting portion 10 is comprised of the base portion 11 and the head portion 12, and is formed at the end portion on the other side of the front frame portion 1 to project inside, the configuration is not limited to this.

For instance, the abutting portion 10 might also be configured in that the height of the head 12 can be switched in stages.

Figure 7A:
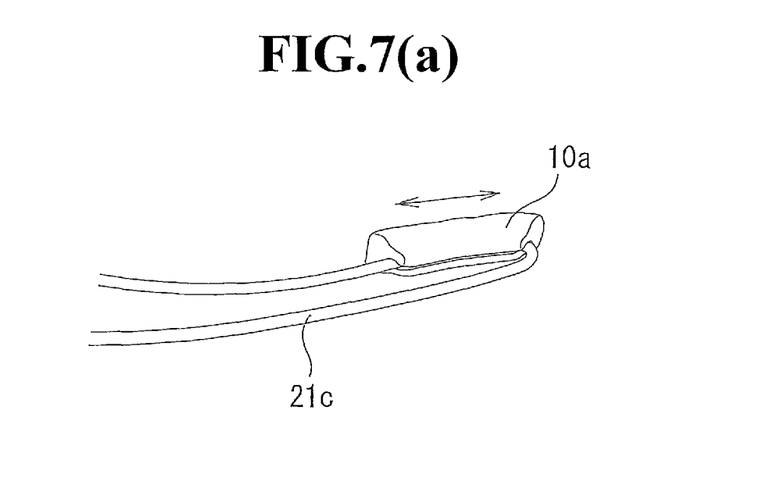
Figure 7B:
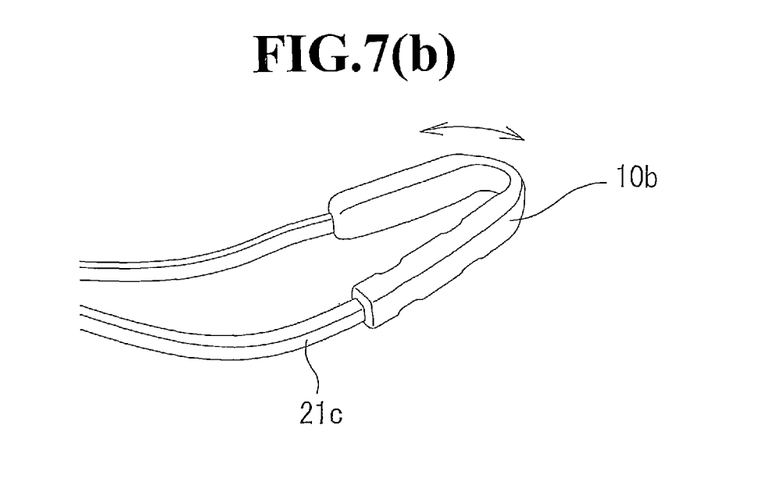

FIG. 7(a) and FIG. 7(b) are perspective views showing abutting portions of eyeglasses according to another embodiment.

As shown in FIG. 7(a), an abutting portion 10a is formed at an end portion on the other side of the second front frame portion 21c and has a polygonal pillar-like shape extending along the longitudinal direction of the second front frame portion 21c at the end portion. In this respect, such a polygonal pillar-like shape also includes a columnar shape.

The abutting portion 10a is formed with a groove and it is mounted by fitting the groove into the second front frame portion 21c at the end portion.

Here, the abutting portion 10a is configured in that its inside (a side of the surface side of the face) is thick so that it can be easily abutted in accordance with the shape of the side surface of the face.

Further, the abutting portion 10a is slidable along the longitudinal direction of the second front frame 21c. Accordingly, it is possible to adjust the position of the abutting portion 10a in accordance with the shape of the face.

As shown in FIG. 7(b), an abutting portion 10b is similarly formed at the end portion on the other side of the second front frame portion 21c and has a polygonal pillar-like shape extending along the longitudinal direction of the second front frame portion 21c at the end portion, such that it has a U-like shape when seen from the top. In this respect, such a polygonal pillar-like shape also includes a columnar shape.

The abutting portion 10b is formed with a hollow portion and it is mounted by fitting the end portion of the second front frame portion 21c to the hollow portion.

Further, the abutting portion 10b is slidable along the longitudinal direction of the second front frame 21c. Accordingly, it is possible to adjust the position of the abutting portion 10a in accordance with the shape of the face.

In case of the eyeglasses 102 according to the third embodiment, while there are formed the first through hole 15a at the mounting portion 15 and the second through hole 15b at the external temple portion 20, and the external temple portion 20 is mounted to the mounting portion 15 by overlapping the first through hole 15a and the second through hole 15b and screwing both members together, the method of mounting is not limited to this. It is also possible to mount the members by insert-fitting or to mount them using magnets.

In case of the eyeglasses 102 according to the third embodiment, while a temple portion with a monitor is mentioned as the external temple portion 20, the present invention is not limited to this, and it might also be a temple portion with a camera or the like. In this case, it will be possible to pick up sceneries or the like at the same height as the eyes of a person.

INDUSTRIAL APPLICABILITY

The present invention can be utilized as eyeglasses which can be easily put on and off with one hand and which are capable of preventing shifts of the eyeglasses when worn.

REFERENCE SIGNS LIST 1, 21, 31, 41 . . . front frame portion,
1a . . . supporting portion,
1b . . . first frame portion,
1c, 21c . . . second frame portion,
2 . . . pad portion,
3 . . . hinge portion,
5, 55 . . . temple portion,
5a . . . picking portion,
5b . . . hook portion,
6 . . . groove,
10 . . . abutting portion,
11 . . . base portion,
12 . . . head portion,
15 . . . mounting portion,
15a . . . first through hole,
15b . . . second through hole,
20 . . . external temple portion,
50, 100, 101, 102 . . . eyeglasses,
51 . . . frame body,
52 . . . pad,
R . . . lens

The invention claimed is:

1. Eyeglasses, comprising:
a pair of right and left lenses,
a front frame portion supporting the lenses, having two end portions at right and left sides,
a pad portion that is mounted to the center of the front frame portion and projects inward to be hooked to a nose of a user,
a temple portion extending rearward from only one of the two end portions on one side of the front frame portion, and
an abutting portion formed at the other end portion on the other side of the front frame portion,
wherein the eyeglasses are put on by hooking the temple portion to an ear while the abutting portion is in a state in which it abuts a side surface of a face.

2. The eyeglasses according to claim 1, wherein
the temple portion is formed with a picking portion along a longitudinal direction of the temple portion.

3. The eyeglasses according to claim 1, wherein
the abutting portion is comprised of a base portion mounted to the other end portion on the other side of the front frame portion to project inward and a disk-like head portion coupled to the base portion, and has a T-like shape when seen from the side.

4. The eyeglasses according to claim 3, wherein a peripheral edge of the head portion on the opposite side of the base portion has a tapered shape.

5. The eyeglasses according to claim 1, wherein the abutting portion has a polygonal pillar-like shape extending along a longitudinal direction of the front frame portion.

6. The eyeglasses according to claim 1, wherein the abutting portion is slidable along the front frame portion.

7. The eyeglasses according to claim 1, wherein the other end portion on the other side of the front frame portion has a J-like shape with its tip being folded back to the inside.

8. The eyeglasses according to claim 1, wherein the front frame portion is comprised of:
 a supporting portion supporting the lenses,
 a first frame portion extending to one side of the supporting portion, and
 a second frame portion extending to the other side of the supporting portion,
 wherein the pad portion is mounted to a center of the supporting portion,
 wherein the temple portion extends rearward from the end portion of the first frame portion,
 wherein the abutting portion is formed at an end portion of the second frame portion, and
 wherein the second frame portion has a loop-like shape.

9. The eyeglasses according to claim 8, wherein a tip end and a rear end of the second frame portion are inserted into the supporting portion, and wherein the tip end or the rear end is slidable within the supporting portion.

10. The eyeglasses according to claim 1, wherein a mounting portion is formed at the other side of the front frame portion and an external temple portion is freely attachable/detachable to and from the mounting portion.

11. The eyeglasses according to claim 10, wherein the external temple portion is a temple portion with a monitor.

12. An eyeglass frame, comprising:
 a front frame portion that is designed to support at least one lens, having two end portions at two sides,
 a pad portion that is mounted to the center of the front frame portion and projects inward to be hooked to a nose of a user,
 one temple portion that extends rearward from one of the two end portions such that the temple portion is hooked by an ear of the user,
 one abutting portion that is formed at the other of the two end portions and is designed to abut in the vicinity of an outer canthus of the user, wherein
 the pad portion contacts to the nose at nose point (A), the temple portion is hooked by the ear at ear point (B) and the abutting portion abuts at canthus point (C),
 the eyeglass frame is held on a user's face only with these points (A) to (C) and the canthus point (C) is positioned closer to the nose point (A) than the ear point (B) is so that the eyeglass frame looks asymmetric from a top view.

* * * * *